March 22, 1960 A. CUPELLA 2,929,876
AUTOMATIC FREQUENCY CONTROL DEVICE OF VERY
HIGH STABILITY AND HIGHLY SENSITIVE
FOR RADIO RECEIVERS
Filed May 9, 1956

INVENTOR.
ALDO CUPELLA
BY Wm. Walter Owen
ATTY.

United States Patent Office 2,929,876

Patented Mar. 22, 1960

2,929,876

AUTOMATIC FREQUENCY CONTROL DEVICE OF VERY HIGH STABILITY AND HIGHLY SENSITIVE FOR RADIO RECEIVERS

Aldo Cupella, Milan, Italy, assignor of one-half to Soc. Metallotecnica, Milan, Italy, a corporation of Italy Application May 9, 1956, Serial No. 583,796

Claims priority, application Italy June 10, 1955

13 Claims. (Cl. 178—88)

In the technics of professional radio reception and particularly in the automatic radio telegraphy a very outstanding thing is that the radio receiver is equipped with an automatic frequency follower of very high stability and being highly sensitive in order to keep always centered the signal in the reception band, which in the highly selective receivers may be very narrow.

The present invention relates to a following and automatic frequency control device of very high stability and highly sensitive for radio receivers and actuated by either continuous wave, or amplitude or frequency keyed, signals, essentially suitable to resolve the problem of keeping centered the signal in the reception band even if the receiver is of high selectivity.

The following and automatic frequency control device of very high stability and highly sensitive for radio receivers, is characterized by providing a radio receiver of a known type with a discriminating circuit of the kind with tuned networks apt to transform the plus or minus frequency variations of the signal carrier, in respect to the central frequency of the reception band, into signals of positive or negative current, and with a relay driven by said discriminating circuit suitable to operate a further device which by driving a variable capacitor of a variable oscillator of a converter circuit of the radio receiver, follows and automatically controls the signals.

The device according to the present invention is particularly characterized in that it comprises: a discriminating circuit provided with laterally tuned networks, said tuned networks consisting of magnetostriction filters, and suitable to transform the plus or minus frequency variations of the signal carrier with respect to the central frequency of the reception band into signals of positive or negative direct current; an electromagnetic relay, or of another type, suitable to be directly driven by the direct current delivered by the discriminating circuit and suitable to close one of the two side contacts (or pair of contacts) according to the sign of the driving current; an electromechanical apparatus, or electric-electromechanical one, driven by the contact closure of the preceding relay and adapted to determine the step by step rotation of the variable capacitor of the variable oscillator of a suitable converter circuit of the radio receiver to which the device is applied.

The device is further particularly characterized in that the two magnetostriction filters of the discriminator consists of two tubes or pipes made with a magnetostrictive material, biased by the same anodic current of the electronic tube (or group of parallel connected tubes) being a part of the discriminating circuit.

According to a particular change, the device is characterized in that the electronic-electromechanical apparatus adapted to drive the variable capacitor rotation consists of two thyratrons (or group of thyratrons) the starting of which, that is determined by the closure of a contact of the relay driven by the discriminator, generates the releasing oscillations causing the pulse closure of an auxiliary relay (one for each of the thyratrons) the operation of which feeds a pulse to a motor the latter either directly or thru a suitable reduction giving one or more angular displacements to the variable capacitor for correcting the frequency.

According to another particular form of embodiment the device is characterized in that the relay directly driven by the discriminator consists of an electromagnetic galvanometer the movable coil of which carries the central contact and the side contacts are caused to vibrate thru the use of a core supporting them; said core is in turn caused to vibrate by the attraction force of an alternating current fed coil, against the action of a suitable spring.

According to a further form of embodiment, the device is characterized in that the electronic-electromagnetic apparatus adapted to drive the variable capacitor rotation consists of a differential mechanism the satellite crown of which is either directly or thru a reduction, connected to the variable capacitor, the planetary wheels of which are respectively joined to two toothed wheels, the motion of the latter being determined by a relay with pawl (of the telephonic selector type) the coil of which is excited by the current pulses sent by the relay driven by the releasing oscillations to which one of the two driving thyratrons is subjected when it is started by the relay driven by the discriminator.

The accompanying drawing shows, only by way of an example, a diagram of the device with some particular embodiments.

Figure 1:
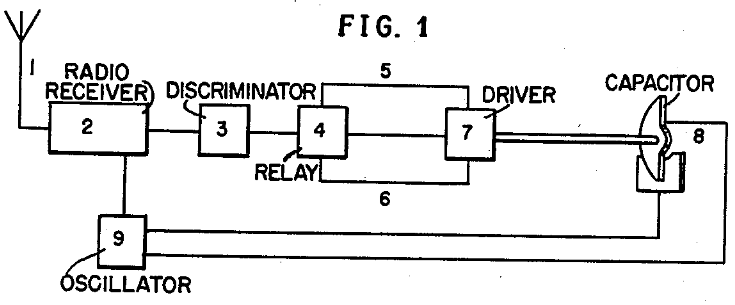
Fig. 1 is a diagrammatic view of the device.

Making reference to the diagram of Fig. 1, the radio signal received by the antenna 1 is amplified, one or more times transformed, and selected by the conventional circuits of the radio receiver 2. The signal carrier is transformed to a given and selected frequency F, and is then sent to the inlet of the discriminator 3 which is the beginning part of device according to the present invention. The discriminator 3 is of the type with laterally tuned networks having the feature that the two networks tuned to a frequency $F+dF$ and $F-dF$ consist of magnetostriction filters adapted to maintain the necessary stability of the discriminator 3 and suitable to directly drive, without successive amplification, the successive electromechanical apparatus (of galvanometer or relay type) 4. If the frequency signal carrier slips to a value higher or lower with respect to F, the electromechanical apparatus 4 sends, thru the connections 5 and 6, the drive for the successive electronic-electromechanical, or electromechanical apparatus 7, which drives mechanically the variable capacitor 8. The capacitor 8 is step by step driven so its action in the oscillating circuit of the free oscillator 9 (representing an oscillator of the converter circuits of the radio receiver 2), causes the step by step drive of the converted frequency of the signal carrier to its previous value F. Because the high stability and the sensitiveness of the discriminator circuit 3, the whole device has an automatic frequency following of the greatest precision on the entire band covered by the excursion of the capacitor 8. Being provided with such a device, a freely tuned radio receiver may be more stable than any crystal controlled radio receiver, even if fitted with special crystals, especially on the higher frequencies.

Figure 2:
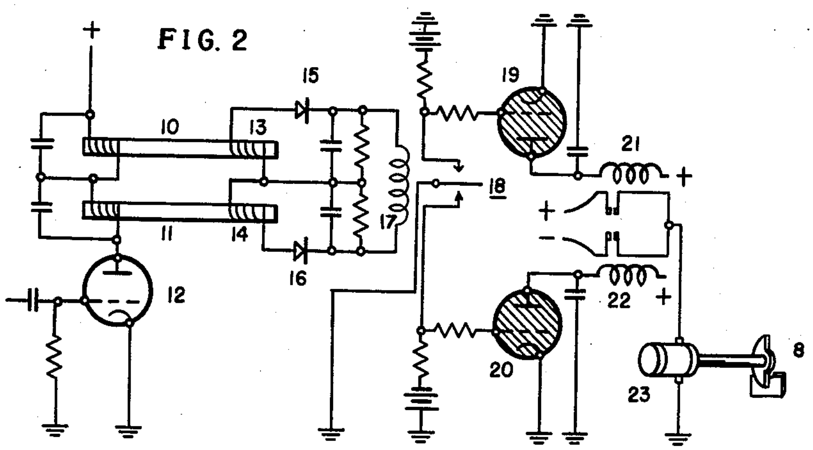
Fig. 2 shows a possible form of embodiment of the same.

According to Fig. 2 10 and 11 are two tubes or pipes of a magnetostrictive material (such as nickel, or permalloy, or invar, or other material) having a mechanical resonance, at the frequencies $F+dF$ and $F-dF$, respectively (F being the frequency as defined in the above description) are biased by the anodic current of the electronic tube 12. If on grid of 12 a signal of frequency F comes from the receiver, at the ends of the coils 13 and 14 there are two equal signals and, thru the rectifiers 15 and 16, two equal direct currents exist, but opposite in sign, whereby no current will flow thru the coil 17 of the relay 18. If the signal on grid of 12 has a frequency slightly higher or lower than F, a current will flow in one direction or in the opposite one in the coil 17. The relay 18 will close one of the two side contacts bringing to ground potential the grid of one of the two thyratrons 19 and 20, which, previously blocked by a fixed biasing negative value, now starts, causing some relaxing oscillations. Such oscillations cause the current pulse passage thru the coil of one of the two relays 21 or 22, which sends current pulses to the motor 23 the rotor of which therefore makes rotation snaps or steps. Such angular displacements are transmitted to the variable capacitor 8, that makes the frequency correction in the manner said above, in connection with Fig. 1. If the signal in the grid of 12 is frequency drifted in with respect to F a signal current of a particular direction will occur which will cause the operation of the relay 21, and the motor 23, and then the capacitor 8 will rotate in a given direction. If the frequency drift is of opposite sign, the relay 22 will act, which will cause the capacitor 8 to rotate in the opposite direction. It is apparent that the connections are so effected that the capacitor rotation will compensate for the frequency drift and will bring the frequency back to its central value F.

Figure 3:
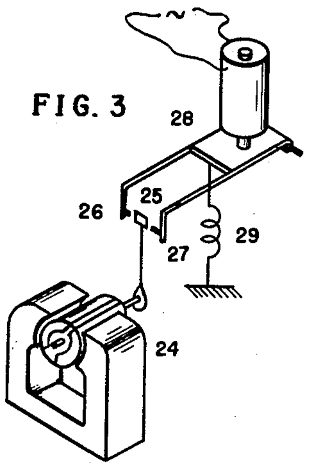
Fig. 3 is an embodiment of a detail of the same device.

According to Fig. 3, 24 is an electromagnetic galvanometer carrying on the pointer of its movable coil the central contact 25, The two side contacts 26 and 27 are attached to the core 28 of a relay. When the coil of said relay is passed thru by a suitable alternating current, its core 28, held by the action of a spring 29, is caused to vibrate. The side contacts 26 and 27 are also caused to vibrate. When the pointer is displaced bringing the contact 25 to touch one of the two contacts 26 and 27, because of the vibration, the material contact will be always good and for the same reason no sticking will occur. This may be very useful or absolutely indispensable in the case of application of the present automatic frequency following device to the reception of telegraphic signals, amplitude keyed, in order to avoid contact sticking with subsequent station loss on the receiver, due to a non-desired frequency correction.

Figure 4:
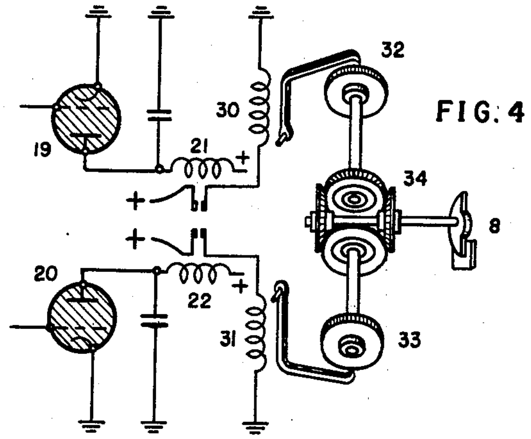
Fig. 4 is a particular embodiment of the electromechanical driving apparatus for the variable capacitor.

According to Fig. 4, 19 and 20 are two thyratrons respectively which drive the relays 21 and 22 and send current pulses to the pawled relays 30 and 31 the latter at each current pulse causing the toothed wheels 32 and 33 to rotate one step (similarly to the telephonic selectors). The motion of said two toothed wheels 32 and 33 is mechanically transmitted to the planetary wheels of a differential 34 the satellite crown of which is mechanically connected, either directly or thru a suitable reduction, to the variable capacitor 8. If the thyratron 19 is started, therefore, the wheel 32 is put in rotation and the capacitor 8 is rotated in a given direction; if the thyratron 20 is started, the wheel 33 is put in rotation and the capacitor 8 is caused to rotate in the opposite direction. This system in comparison with that of Fig. 2, may allow a greater precision in the step by step drive of the variable capacitor and consequently a greater precision in bringing back the signal frequency to its central value F. Practically, said two systems are equivalent being that each frequency step generated by the drive is lower than the minimum error drift detectable by the unit discriminator-relay to avoid causing the device to oscillate.

Although the present invention has been described thru the diagrammatic embodiments herein disclosed, only as a way of examples, it is obvious that many changes and modifications are possible without departing from the true scope and spirit of the same invention as defined by the enclosed claims.

What is claimed is:

1. An automatic frequency control system for apparatus which includes a converter for mixing an incoming signal with a signal from a local oscillator to produce a beat signal, said system comprising means for sensing frequency drift and direction between the beat signal frequency and a nominal frequency, said means comprising a circuit comprised of two tuned filters, one tuned above and the other below the nominal frequency whereby any variation between the beat signal frequency and the nominal frequency produces signals of different amplitudes in the output of each of said tuned filters, means for converting said signals produced by said sensing means into a resultant positive or negative current depending upon the direction of said frequency drift, a pair of normally blocked pulsing oscillators, means responsive to said positive or negative current for rendering a corresponding one of said oscillators operative to produce output pulses, said local oscillator including a variable capacitor for adjusting its frequency, a driving device mechanically coupled to the capacitor, means responsive to said pulses for operating said driving device in incremental steps in one or the other direction according to which oscillator is operative, to change the capacitor setting, and to thereby change the frequency of the beat signal in incremental steps until it corresponds to said nominal frequency.

2. An automatic frequency control system according to claim 1, wherein said tuned filters comprise magnetostriction type filters, whose input windings are connected in series, and whose output windings are connected to said converting means.

3. An automatic frequency control system according to claim 1, wherein said driving device comprises a motor operated in one direction when one of said oscillators is operative and in the other direction when said other oscillator is operative.

4. An automatic frequency control system according to claim 1, wherein said driving device comprises planetary wheels the direction of motion of which is determined by the operation of said oscillators.

5. An automatic frequency control system according to claim 1, wherein said means responsive to said positive or negative current comprises a polar relay having an armature contact movable relative to two side contacts and a winding connected to said converting means, said side contacts being connected respectively to said oscillators, so that said positive or negative current flowing in the winding operates the armature contact to a respective side contact to start the corresponding oscillator.

6. An automatic frequency control system according to claim 5, wherein each of said oscillators includes a thyratron having a control grid, a blocking bias source connected to the grid, and a source of starting potential which is connected to the grid responsive to closure of said corresponding side contact.

7. An automatic frequency control system according to claim 5, wherein said polar relay comprises an electromagnetic galvanometer having a movable coil which carries said armature contact.

8. An automatic frequency control system as claimed in claim 7 wherein said side contacts are mounted on a core, said core caused to vibrate by alternating current fed thereto, said side contacts caused to vibrate by said core, whereby said closure of said central contact with either of said side contacts is substantially stickproof.

9. An automatic frequency control system according to claim 1, wherein each of said oscillators comprises a thyratron having an anode, a cathode and a control grid, a condenser connected between the anode and cathode, a blocking bias source connected to the grid, and a source of starting potential and means for applying it to the grid responsive to the corresponding polarity of current flow from said converting means.

10. An automatic frequency control system according to claim 9, wherein said means for operating said driving device comprises a pair of auxiliary pulsing relays, one connected in the anode circuit of each thyratron.

11. An automatic frequency control system as claimed in claim 10, wherein said driving device comprises a motor operated in one direction when one of said thyratrons is fired and in the other direction when said other thyratron is operated.

12. An automatic frequency control system as claimed in claim 10, wherein said driving device comprises planetary wheels the direction of motion of which is determined by the operation of said thyratrons.

13. An automatic frequency control system according to claim 10, wherein said tuned filters comprise magnetostriction type filters, and wherein said means responsive to said positive or negative current comprises a polar relay having an armature contact movable relative to two side contacts and a winding connected to said converting means, said side contacts being connected respectively to said oscillators, so that said positive or negative current flowing in the winding operates the armature contact to a respective side contact to start the corresponding oscillator.

References Cited in the file of this patent

UNITED STATES PATENTS

| | | |
|---|---|---|
| 1,653,659 | Reeve | Dec. 27, 1927 |
| 1,719,484 | Norton | July 2, 1929 |
| 1,794,932 | Usselman | Mar. 3, 1931 |
| 1,844,973 | Ports | Feb. 16, 1932 |
| 1,972,141 | Gilbert | Sept. 4, 1934 |
| 2,138,042 | Robinson | Nov. 29, 1938 |
| 2,541,128 | Violet | Feb. 13, 1951 |
| 2,569,000 | Hadfield | Sept. 25, 1951 |
| 2,644,035 | Trevor | June 30, 1953 |
| 2,662,217 | Van Roberts | Dec. 8, 1953 |

OTHER REFERENCES

"Electronic and Radio Engineering" by F. E. Terman, published by McGraw-Hill Book Co., Inc., fourth edition, page 648.